(12) United States Patent
Corvinelli et al.

(10) Patent No.: US 11,593,372 B2
(45) Date of Patent: Feb. 28, 2023

(54) AUTOMATED FEEDBACK AND CONTINUOUS LEARNING FOR QUERY OPTIMIZATION

(71) Applicant: International Business Machines Corporation, Armonk, NY (US)

(72) Inventors: Vincent Corvinelli, Mississauga (CA); Mohammed Fahd Alhamid, North York (CA); Mohamad F. Kalil, Ottawa (CA); Calisto Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 16/917,987

(22) Filed: Jul. 1, 2020

(65) Prior Publication Data
US 2022/0004553 A1 Jan. 6, 2022

(51) Int. Cl.
*G06F 16/2453* (2019.01)
*G06N 20/00* (2019.01)
*G06F 16/28* (2019.01)

(52) U.S. Cl.
CPC ...... *G06F 16/24549* (2019.01); *G06F 16/288* (2019.01); *G06N 20/00* (2019.01)

(58) Field of Classification Search
CPC .................. G06F 16/24549; G06N 20/00
See application file for complete search history.

(56) References Cited

U.S. PATENT DOCUMENTS

| 6,763,359 | B2  |   | 7/2004  | Lohman  |             |
| 2002/0198867 | A1 | * | 12/2002 | Lohman  | G06F 16/24549 |
| 2010/0235347 | A1 |   | 9/2010  | Chaudhuri |           |
| 2013/0262498 | A1 |   | 10/2013 | Chen    |             |

(Continued)

FOREIGN PATENT DOCUMENTS

WO    2022003469 A1    1/2022

OTHER PUBLICATIONS

Ivanov, Oleg, "Machine learning for better query planning", Apr. 8, 2016, Professional Postgres, www.ostgrespro.ru, 74 pages, <http://www.machinelearning.ru/wiki/images/9/95/BMMO_16_Ivanov_DBMS.pdf>.

(Continued)

*Primary Examiner* — Grace Park
(74) *Attorney, Agent, or Firm* — Joseph P. Curcuru

(57) ABSTRACT

In an approach to improve query optimization in a database management system, embodiments identify opportunities for improvement in a cardinality estimate using a workload feedback process using a query feedback performed during query compilation. Embodiments identify correlations and relationships based on the structure of the query feedback and the runtime feedback performed, and collects data from the execution of a query to identify errors in estimates of the query optimizer. Further, embodiments submit the query feedback and the runtime feedback to a machine learning engine to update a set of models. Additionally, embodiments update a set of models based on the submitted query feedback and runtime feedback, and output a new, updated, or re-trained model based on collected data from the execution of the query to identify the errors in estimates of the query optimizer, the submitted query feedback and the runtime feedback, or a trained generated mode.

25 Claims, 5 Drawing Sheets

(56) References Cited

U.S. PATENT DOCUMENTS

| | | | |
|---|---|---|---|
| 2016/0034530 A1 | 2/2016 | Nguyen | |
| 2016/0140125 A1 | 5/2016 | Goyal | |
| 2017/0323200 A1 | 11/2017 | Corvinelli | |
| 2019/0203475 A1 | 7/2019 | Burkes | |
| 2019/0303475 A1* | 10/2019 | Jindal | G06F 16/24534 |
| 2020/0379963 A1* | 12/2020 | Lopes | G06F 16/24549 |
| 2021/0263932 A1* | 8/2021 | Shaffer | G06F 16/24542 |

OTHER PUBLICATIONS

Kipf et al., "Estimating Cardinalities with Deep Sketches", arXiv:1904.08223v1 [cs.DB] Apr. 17, 2019, 4 pages, <https://arxiv.org/pdf/1904.08223.pdf>.

Marcus et al., "Neo: A Learned Query Optimizer", arXiv:1904.03711 v1 [cs.DB] Apr. 7, 2019, 18 pages, <https://arxiv.org/abs/1904.03711>.

Marcus et al., "Towards a Hands-Free Query Optimizer through Deep Learning", 9th Biennial Conference on Innovative Data Systems Research (CIDR '19), Jan. 13-16, 2019, Asilomar, California, USA, 8 pages, <https://www.cs.brandeis.edu/~olga/publications/HandsFreeCIDR19.pdf>.

"Patent Cooperation Treaty PCT Notification of Transmittal of the International Search Report and the Written Opinion of the International Searching Authority, or the Declaration", Applicant's file reference P201911370, International application No. PCT/IB2021/055328, International filing date 16. Jun. 2021, dated Sep. 6, 2021, 10 pages.

* cited by examiner

AUTOMATED FEEDBACK AND CONTINUOUS LEARNING FOR QUERY OPTIMIZATION

BACKGROUND OF THE INVENTION

The present invention relates generally to the field of query optimization, and more particularly to query optimization for execution in a distributed computing environment.

Query optimization is a feature of many relational database management systems. The query optimizer attempts to determine the most efficient way to execute a given query by considering the possible query plans. Generally, the query optimizer cannot be accessed directly by users once queries are submitted to the database server and the queries are parsed by the parser. Once the queries are submitted and parsed they are then passed to the query optimizer for optimization; however, some database engines allow the query optimizer to be guided using hints or instructions from a user or source code.

A query is a request for information from a database. Query results are generated by accessing relevant database data and manipulating it in a way that yields the requested information. In most cases, database structures are complex resulting in the needed data for a query being collected from a database by accessing the database in different ways, through different access paths and different join methods and join orders. Each different path and/or method typically requires different processing time. Processing times of the same query may contain large variances, from a fraction of a second to hours, depending on the way the query is selected. The purpose of query optimization, which is an automated process, is to find the way to process a given query in least amount of time possible. The large possible variance in query processing times justifies performing query optimization, though finding the exact optimal way to execute a query, among all possibilities, is typically prohibitively complex, time-consuming, costly, and often practically impossible.

SUMMARY

Embodiments of the present invention disclose a method, a computer program product, and a system for query optimization, the embodiments comprising: identifying, by a query optimizer, opportunities for improvement in a cardinality estimate using a workload feedback process comprising a query feedback performed during query compilation; identifying, correlations and relationships based on a structure of the query feedback and a runtime feedback performed; collecting, by the query optimizer, data from an execution of a query to identify errors in estimates of the query optimizer; submitting, by the query optimizer, the query feedback and the runtime feedback to a machine learning engine to update a set of models; updating, by a machine learning engine, a set of models based on the submitted query feedback and runtime feedback; and outputting a new, updated, or re-trained model based on collected data from the execution of the query to identify the errors in estimates of the query optimizer, the submitted query feedback and the runtime feedback, or a trained generated model.

DETAILED DESCRIPTION

Figure 1:
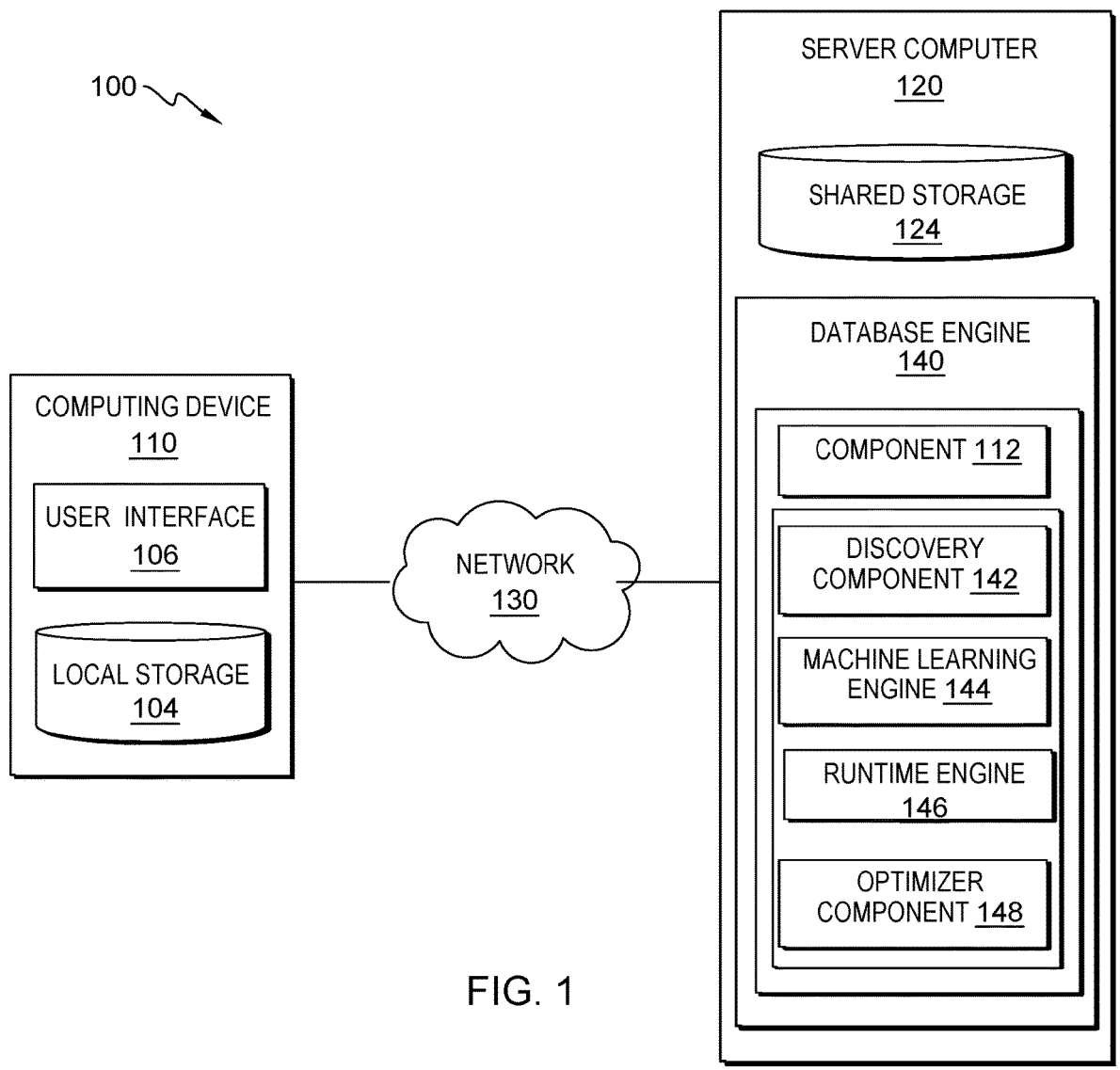
FIG. 1 is a functional block diagram illustrating a distributed data processing environment, in accordance with an embodiment of the present invention.

Embodiments of the present invention recognize that the current art (e.g., a cumulative frequency function (CFF) model) has shown that estimates off by more than one-order of magnitude may lead to sub-optimal plans (e.g., plans that fall below or outside of a predetermine threshold and/or predetermined range) while estimates within one order of magnitude generally give reasonable plans (e.g., plans that are above or within a predetermined threshold and/or predetermined range). Therefore, embodiments of the present invention recognize that there is a need for a model to learn from its mistakes and accommodate critical data points that might be missed during the sampling step. Embodiments of the present invention improve the art by using machine learning (ML) to enable adaptability to the accumulated changes to database relations over time.

Embodiments of the present invention recognize that the current art may be adapted to work seamlessly with any model known in the art (e.g. a statistical model or a small sample model). Additionally, the methodology associated to embodiments of the present invention is not restricted to cardinality estimation but could be used for any aspect of query optimization. For example, the methodology associated to embodiments of the present invention could easily be adapted to estimate the various costs such as performance costs and/or economic costs (e.g., input/output (I/O), central processing unit (CPU), and/or network or memory usage of an operation). Additionally, embodiments of the present invention recognize that different solutions that involve using statistics as feedback have been implemented by different database vendors in the past; however, none of the implemented solutions bring the power of machine learning to query optimization.

Furthermore, embodiments of the present invention recognize that the current art uses deep neural networks to build query execution plans by continuously learning from previously executed queries. Embodiments of the present invention recognize that the main drawback of the currently used methods known in the art is that currently used methods known in the art rely on learning correlations through word similarities in the data which may produce a model that may grow larger than the size of the data itself; additionally, embodiments of the present invention recognize that applying approaches that are currently known in the art can demonstrate and produce inaccurate results.

Embodiments of the present invention recognize that the current database systems may collect column and multi-column statistics in an automated or manual mode in order to be more robust to the data changes by accounting for statistical correlations between multiple values. Similarly, the proposed CFF model within embodiments of the present invention may be fully retrained when larger data changes occur and the model's predictions start accumulating larger errors. Automated feedback is beneficial at this point to trigger the model's retraining actions. Embodiments of the present invention measure the performance of the model's estimated cardinality against the actual cardinalities collected from each individual component of an executed access plan, wherein the feedback received from this measure of performance is referred to as observed feedback. In addition, the observed feedback may determine and identify which relation and which individual, or group of columns have the potential to build a new model once the optimizer identifies no model is pre-built on the relations or group of columns.

For example, strong statistical correlation between values in two columns may be candidates (i.e., contain potential to build a new model) since a combination of predicates on those columns will produce more accurate estimates in comparison to the default independence assumption that may lead to underestimation. Consider a pair of predicates TREE='APPLE' AND TYPE='RED APPLE' with 40 distinct values in TREE and 2000 distinct values in TYPE accumulated in a table of 10000 rows. The same type of apple might occur in two different trees and assuming that there are 2500 unique combinations of TREE and TYPE values, i.e., on average 4 rows with a unique combination. The database optimizer might underestimate the cardinalities if the probabilities on individual columns is used (i.e., naively $(1/40)*(1/2000)*10000=0.125$ rows). However, using the number of distinct combinations, embodiments of the present invention generate a more realistic estimate of $(1/2500)*10000=4$ rows. Embodiments of the present invention keep a list of models and the list of columns used to build the model in a database table. In various embodiments of the present invention, the kept list of models and the list of columns may consist of new and historic (e.g., previously used or generated) models and columns, and/or new and historic columns that contain potential to build a new model. Additionally, embodiments of the present invention enable a serviceability aspect in case a database user needs to report a query performance problem to the database vendor.

The serviceability aspect enables testing or falling back to a previous model after retraining, wherein the model version and training timestamp are maintained (e.g., stored) to enable the model to revert to the previous model version from its current model version based on the maintained model version and training timestamp. For example, if a model's current model version is 2.2 and current training timestamp is May 1, 2020 and the most recently maintained model version is 2.1 and training timestamp is Apr. 29, 2020 then the model will fall back to model version 2.1. Alternatively, in another embodiments, embodiments of the present invention enable the model to revert to the most current model version from the previous model version.

Embodiments of the present invention recognize that the current art requires implementing a feedback loop from a runtime component to the optimizer component or from the feedback loop to the optimizer component itself to consider retraining of the ML model. Additionally, embodiments of the present invention recognize that the current art is expensive to train when compared to the proposed invention. Embodiments of the present invention recognize that to train systems in the current art, the systems in the current art either have to wait on users' queries (e.g., the model might take longer to be trained depending on the query rate and diversity of data (i.e., how representative the data is to the actual distribution)), or by randomly generating queries and executing them, which would result in large amounts of overhead. Embodiments of the present invention improve the current art by solving the training and overhead issues stated above by training one or more samples, discovering (i.e., identifying) candidate columns without executing queries against the full data (i.e., the entire set of predetermined data) through a predetermined database interface, using feedback from the actual query execution to refine the retraining effort to make the retrained model more relevant to the workload, and retraining of the ML model more efficient.

Additionally, embodiments of the present invention propose the use of ML to have the adaptability to accumulate change on the database relations over time. In various embodiments of the present invention, changes to the data involved in the models may trigger retraining if the estimates exceed or fall within a predetermined value or range of values from the actual query execution, actual cardinalities and/or actual distribution. Embodiments of the present invention improve the current art by presenting a system of query optimization to build, efficiently train, maintain, evaluate, and use models, learned or otherwise. Furthermore, embodiments of the present invention improve the art by enabling the present invention to be applied to any statistical/learned models known in the art and embodiments of the present invention may bridge the gap between data discovery and feedback. Embodiments of the present invention recognize that looping back the error points would make the model more complex and increase the model size and inference time.

Embodiments of the present invention recognize that continuous learning is sensitive to model retraining or model adjustments to internal weighting using new data points. Additionally, embodiments of the present invention recognize that looping all or randomly selected queries from the runtime feedback could bias the model predictions. For example, embodiments of the present invention selectively learn, via model in predicate logic, that the majority of the model's errors have lower selectivities. In this example, looping those points would make the model biased towards lower selectivities. Embodiments of the present invention may use stratified sampling where the classes represent the groups of selectivities (e.g., values between 0.0 to 1.0), to improve the art and reduce model bias. For example, using stratified sampling on all or randomly selected queries from the runtime feedback improved the model performance on the same testing queries that did not use stratified sampling.

Implementation of embodiments of the invention may take a variety of forms, and exemplary implementation details are discussed subsequently with reference to the FIG.s (i.e., FIG. 1-FIG. 5).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of user interfaces. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 5.

User interface (interface) 106 provides an interface to the automated feedback and continuous learning component (component) 112. Computing device 110, via user interface 106, may enable a user and/or a client to interact with component 112 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 5. In some embodiments server computer 120 may represent a plurality of server computers.

Each of shared storage 124 and local storage 104 may be a data/knowledge repository and/or a database that may be written and/or read by one or a combination of component 112, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory.

In some embodiments of the present invention, shared storage 124 and/or local storage 104 may each be a hard drive, a memory card, a computer output to laser disc (cold storage), and/or any form of data storage known in the art. In some embodiments, shared storage 124 and/or local storage 104 may each be one or more cloud storage systems and/or databases linked to a cloud network. In various embodiments, shared storage 124 and/or local storage 104 may access, store, and/or house user data, physical room data, and meeting data, and/or data shared throughout distributed data processing environment 100.

In the depicted embodiment, database engine 140 executes on server computer 120. In other embodiments, database engine 140 may be executed on computing device 110. In various embodiments of the present invention, not depicted in FIG. 1, database engine 140 may execute on a plurality of server computers 120 and/or on a plurality of computing devices 110. Database engine 140 is the underlying software component that a database management system (DBMS) uses to create, read, update and delete (CRUD) data from a database, as it is understood in the art. In various embodiments of the present invention, database engine 140 (i.e., database management systems) comprises an application programming interface (API) that allows the user to interact with their underlying engine without going through the DBMS user interface.

In the depicted embodiment, component 112 is executed on database engine 140 on server computer 120. In other embodiments, component 112 may be executed on computing device 110. In various embodiments of the present invention, not depicted in FIG. 1, component 112 may execute on a plurality of database engines 140, a plurality of server computers 120 and/or on a plurality of computing devices 110. In some embodiments, component 112 may be located and/or executed anywhere within distributed data processing environment 100 as long as component 112 is connected to and/or communicates with database engine 140, computing device 110, and/or server computer 120, via network 130.

In various embodiments of the present invention, component 112 enables an automated feedback approach, wherein once a query has been executed, component 112 may identify and/or retrieve the number of actual rows for each relation in the query or operator in an execution plan, and compare the retrieved number of rows against one or more rows based on the predicted cardinalities. The cardinality estimations that are above or below a predetermined threshold may be kept in a separate table. The tables containing estimated cardinality anomalies versus actual cardinality anomalies are aggregated to filter out infrequent and secondary feedback data by various algorithms (e.g., the filtered out infrequent and secondary feedback data may include: relevance, frequency of use, and impact on performance to keep the data compact and fed to the component that decides when and how to retrain the models). In various embodiments of the present invention, component 112 may filter out infrequent and predetermined feedback, which may include: relevance, frequency of use, and impact on performance to keep the data compact and fed to the component that decides when and how to retrain the models. In various embodiments of the present invention, component 112 may only keep the predicate literals. The next time the model is retrained, component 112 may add the kept literals to a materialized sample or to a new sample collected randomly from the original relationship.

In various embodiments of the present invention, depending on the actual implementation of a proposed model (e.g., CFF model), collected points that are miss-predicted may also be used to adjust the model parameters instead of fully retraining. In various embodiments of the present invention, component 112 may collect column and multi-column statistics in an automated or manual mode to be more robust to the data changes by accounting for statistical correlation between multiple values. In various embodiments of the present invention, the proposed model may be fully retrained when larger data changes occur and the model's predictions start accumulating larger errors, wherein larger data changes comprise changes in data that require more memory and/or computing power. In another embodiment of the present invention, where the ML models are used to predict operation costs or memory, actual operation costs or memory used may be retrieved and used for comparison with the estimated costs and/or memory in order to determine accuracy of the estimated costs and/or memory and/or identify if there are any cost or memory savings or areas that can be reduced to proving costs or memory savings.

In various embodiments of the present invention, component 112 may identify when a model's predictions begin to accumulate errors and may activate automated feedback to trigger the models retraining actions. Component 112 may measure the performance of the models against the actual cardinalities collected from each individual components of the executed access plan. Additionally, in various embodiments of the present invention, component 112 may use the observed feedback to determine which relationship or group of columns have the potential to build a new model if the optimizer component identifies that no model has been pre-built based on the relations or group of columns. Component 112 may store the list of models and the list of columns used to build the model in a database table on local storage 104 and/or shared storage 124, wherein the stored list of models and the list of columns can be retrieved, referenced, and/or compared against future list of models and the list of columns used to build the model. In various embodiments of the present invention, component 112 may test a new or retrained model and/or fall back to a previous model after re-training, during database service, wherein the model version and training timestamp are maintained (e.g., stored) to enable the model to revert to the previous model version from its current model version based on the maintained model version and training timestamp.

Figure 2:
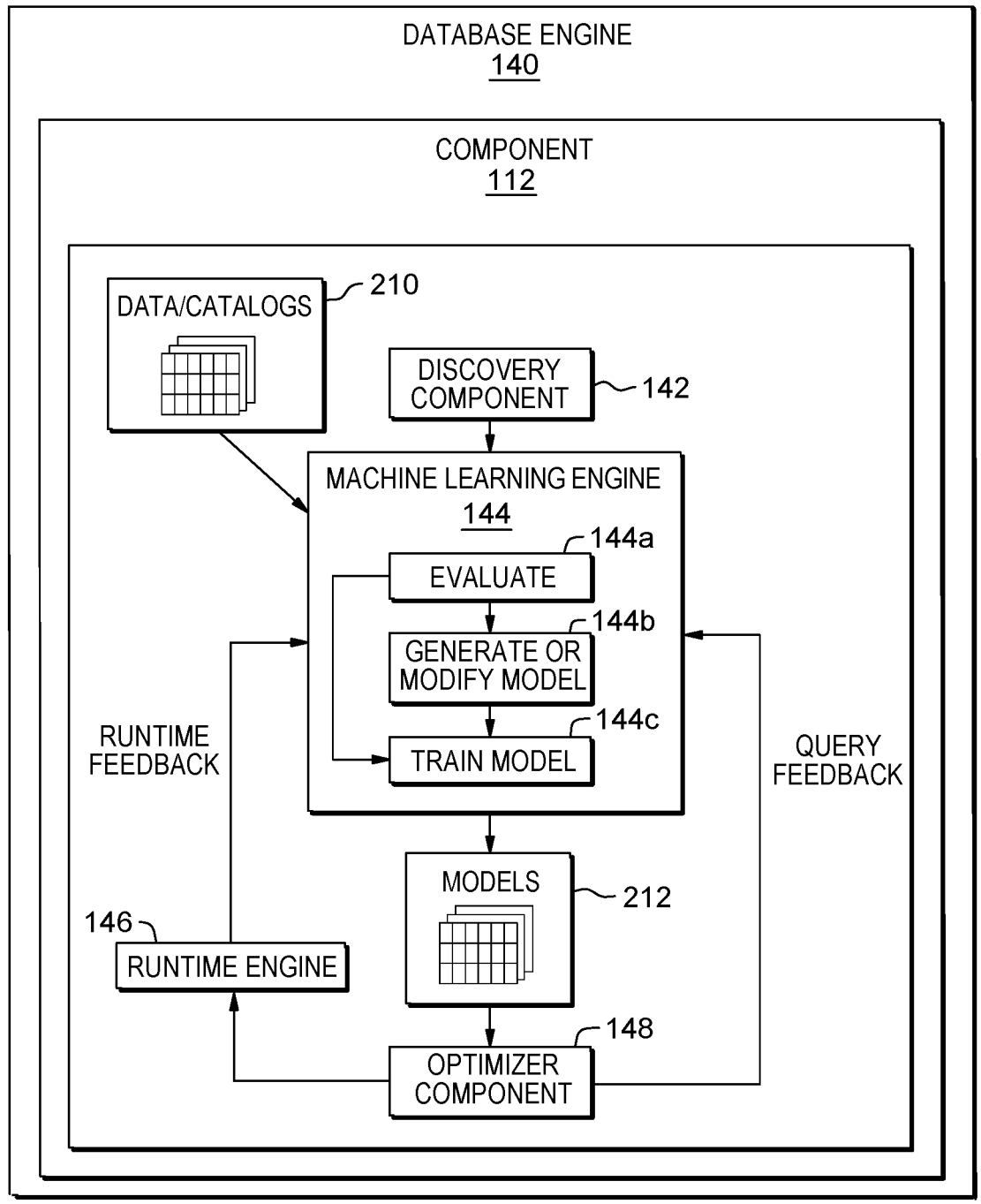
FIG. 2 illustrates a block diagram depicting an automated feedback and continuous learning component, executing on a server computer, within distributed data processing environment of FIG. 1, for automated feedback and continuous learning for query optimization, in accordance with an embodiment of the present invention.

FIG. 2 illustrates a block diagram depicting component 112 in communication with computing device 110 and/or server computer 120, within distributed data processing environment 100 of FIG. 1, for automated feedback and continuous learning for query optimization, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In various embodiments of the present invention, component 112 may be adaptive and continuously learning; additionally, component 112 may automate performance feedback for cardinality estimation (e.g., predicted number of rows that are input and output through various operations in the query execution plan). In various embodiments of the present invention, component 112 consists of two main processes: data discovery and workload feedback. The data discovery process is executed by discovery component 142 performing an analysis of the data and meta-data (catalogs 210), that is stored in the database and/or received from data input, to identify relationships and/or correlations within each table and across a plurality of tables. In various embodiments of the previous invention, component 112 can search for and retrieve catalogs 210 from online search engines and/or online databases. The data discovery process prepares the system up front with existing models (e.g., models 212) that may be available during query compilation and optimization.

The workload feedback process identifies opportunities for improvement in the cardinality estimate through both query optimizer feedback and runtime feedback. The query optimizer feedback is performed by query optimizer component (optimizer component) 148 during query compilation, wherein optimizer component 148 may identify correlations and relationships based on the query structure. For example, if a model exists on table "T" on columns C1, C2, C3 but a plurality of queries include a predicate referencing an expression on C2 and C3, such as C2='xyz' AND C4=10 AND MOD(C3,5)=0, then the query feedback will identify that C4 and the expression MOD(C3,5) is missing and should be added to the model when retrained and evaluated. In the depicted embodiments, the runtime feedback is performed by runtime engine 146, wherein runtime engine 146 may collect data from the execution of the query to identify errors critical to performance (e.g., miss-predicted points in the optimizer's estimates as described earlier versus actual execution feedback). Miss-predicted points may also be used to adjust the model parameters instead of retraining the full model.

In the depicted embodiment, machine learning engine (engine) 144 may perform the following steps: evaluate 144a, generate or modify one or more models 144b, and train one or more models 144c. During the evaluate step (i.e., evaluate 144a) input data from both the discovery and feedback process data is accumulated, from which the set of models (e.g., models 212) to build or modify are identified. Retraining one or more models may be required if the data or workload has changed by a predetermined amount or model 212 lacks coverage of attributes (i.e., columns) relevant to the workload. The evaluate step (i.e., evaluate 144a) includes identifying that an existing and/or functioning/operational model (i.e., appropriate model) already exists but a retraining operation might be required if the model is no longer achieving the required level of performance, or if the model was recently updated, automatically reverting back to the previous model. Evaluate 144a may identify whether retraining operation is required if the model is no longer achieving the required level of performance. In various embodiments of the present invention, during evaluate 144a, engine 144 may identify if a recently updated model is achieving lower performance than a previous one, in such cases where the updated model is achieving lower performance then engine 144 may automatically revert back to the previous model.

In various embodiments of the present invention, during evaluate 144a, engine 144 may determine whether an existing model, that might be augmented with additional predetermined columns, may take more time to retrain and may identify if the existing model may need to be suitably split into two or more models to reduce training time or model size. In various embodiments of the present invention, during the generate step, (generate or modify model 144b), engine 144 builds or updates a model (i.e., model 212) based on the input requirements from the evaluate step. Model 212 may be one or more models or set of models in database management system. In various embodiments of the present invention, during the train step, 144c, engine 144 may initiate a full initial training of a new model or may initiate a retraining of an existing model or may perform an incremental update of to the model dependent on the evaluation performed in the evaluate step.

In various embodiments of the present invention, during query compilation, a query compiler may lookup models stored in a database (shared and/or local storage) or online and retrieve one or more available models and make them available for use during query optimization. It should be appreciated that this system is not contingent on the CFF models. This is one embodiment of the invention and the system may be adapted to work seamlessly with any model, learned, developed, retrieved and/or instructed (e.g. a statistical model or small samples). Additionally, some embodiments of the present invention are not restricted to cardinality estimation but could be used for any aspect of query optimization. For example, the methodology could be easily adapted to estimate the various costs such as I/O, CPU, network and/or memory usage of an operation.

In various embodiments of the present invention, runtime engine 146 may execute the implementation of runtime feedback. In various embodiments of the present invention, in the context of cardinality estimation, runtime engine 146 may identify and retrieve the number of actual rows for each relation in the query or operator in the execution plan, wherein the number of actual rows may be predetermined. In various embodiments of the present invention, runtime engine 146 may compare the retrieved number of actual rows against the predicted cardinalities, wherein the cardinality estimates that are above or below a predetermined threshold are stored as points in one or more separate tables, and the cardinality estimates that are within or equal to the predetermines threshold are maintained are stored and maintained in the current table(s). In various embodiments of the present invention, the next time the model is retrained, the stored points may be added to a materialized sample or to a new randomly collected sample. The list of models and lists of columns used to build one or more models in a database table are stored on local storage 104 and/or shared storage 124, wherein the stored lists of models and lists of columns may be retrieved and utilized to address future queries, model retraining, model building, and/or any other actions known in the art. In various embodiments of the present invention, component 112 may store and/or maintain model versions and training timestamps of new or retrained models. In various embodiments of the present invention, component 112 may execute a fall back command (i.e., fall back) to a previous model (i.e., stored model) after retraining based on the stored model version and training timestamp.

In various embodiments of the present invention, optimizer component 148 may execute the implementation of continuous learning. In various embodiments of the present invention, in the context of cardinality estimation, component 112 may determine and identify if one or more queries fall under the error threshold (e.g., an error bandwidth of one-order of magnitude in one or more queries is considered acceptable) before noticing any plan changes selected by optimizer component 148. Queries that fail to fall under the error threshold are considered candidates for continuous learning.

Figure 3:
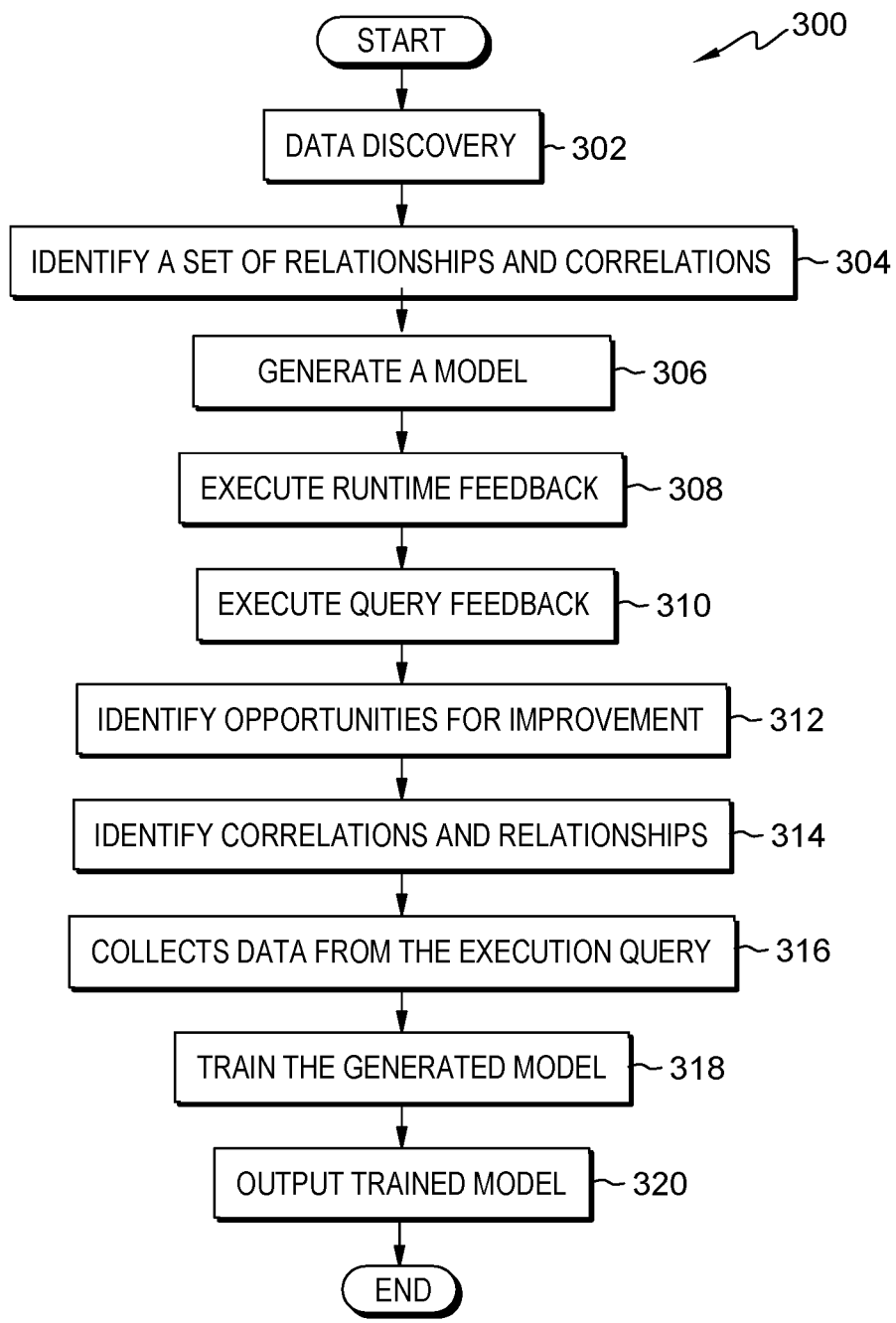
FIG. 3 illustrates operational steps of the automated feedback and continuous learning component, on a computing device within the distributed data processing environment of FIG. 1, for automated feedback and continuous learning for query optimization, in accordance with an embodiment of the present invention.

FIG. 3 illustrates operational steps of component 112, generally designated 300, in communication with computing device 110, within distributed data processing environment 100 of FIG. 1, for automated feedback and continuous learning for query optimization, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 112 performs data discovery on data and catalogs. In various embodiments of the present invention, component 112, via discovery component 142, performs data discovery on received and/or retrieved catalogs 210, wherein the data discovery process comprises discovery component 142 performing an analysis of the data and meta-data (i.e., catalogs 210) within the database to identify relationships, skew and/or correlations within and across a plurality of tables. This prepares the system up front with models that may be available during query compilation and optimization. In various embodiments of the present invention discovery component 142 may retrieve and/or receive catalogs 210 from local storage 104, shared storage 124, and/or an online search engine.

In step 304, component 112 identifies a set of relationships and correlations of interest within each table and across multiple tables in a database. In various embodiments of the present invention, component 112 may identify one or more sets of relationships and correlations of interest within one or more tables and across multiple tables in a database, via discovery component 142, using a data discovery process (similar to FIG. 2), wherein the data discovery process performs an analysis of data and meta-data in a database using predetermined criteria. In various embodiments of the present invention, one or more sets of relationships and correlations of interest may be identified based on predetermined data, parameters, and/or criteria.

In step 306, component 112 generates a model or set of models. In various embodiments of the present invention, component 112, via machine learning engine 144, may generate a set of models using the set of relationships and correlations of interest identified using predetermined criteria. In some embodiments, the set of models may be a set of potentially useful models meaning the generated models may be useful or used in some compacity at some point in time. In various embodiments of the present invention, component 112, via machine learning engine 144, may build or update one or more models (e.g., based on the input requirements from the evaluate step.

In step 308 component 112 executes runtime feedback. In various embodiments of the present invention, component 112, via runtime engine 146, performs runtime feedback. In various embodiments of the present invention, component 112, via runtime engine 146, may collect data from the execution of the query to identify errors in the optimizer's estimates. Miss-predicted points may be used to adjust the model parameters instead of fully retraining the entire model.

In step 310, component 112 executes query feedback. In various embodiments, component 112, via optimizer component 148, execute query feedback during query compilation. In various embodiments, component 112, via optimizer component 148, may identify correlations and relationships based on one or more query optimizer feedback structures and the runtime feedback performed by runtime engine 146.

In step 312, component 112 identifies opportunities for improvement in a cardinality estimate. In various embodiments of the present invention, component 112, via optimizer component 148, may identify opportunities for improvement in a cardinality estimate using a workload feedback process (described above) comprising a query feedback performed by a query optimizer (e.g., optimizer component 148) during query compilation. In various embodiments of the present invention, component 112, via optimizer component 148, may identify opportunities for improvement in a cardinality estimate based on query feedback and runtime feedback. In various embodiments of the present invention, component 112, via machine learning engine 144, may accumulate and evaluate input data from both the discovery and feedback processes (similar to FIG. 2, evaluate step (evaluate 144a)), from which the set of models to build or modify are identified. The evaluate step (i.e., evaluate 144a) includes identifying that the appropriate model already exists but a retraining operation might be required if the model is no longer achieving the required level of performance, or if the model was recently updated, automatically reverting back to the previous model. Evaluate 144a may identify whether retraining operation is required if the model is no longer achieving the required level of performance In step 314, component 112 identifies correlations and relationships based on a structure of a query and runtime feedback. In various embodiments of the present invention, component 112, via runtime engine 146, may identify correlations and relationships of interest based on a structure of the query and runtime feedback.

In step 316, component 112 collects data from the execution of the query to identify errors in estimates of the query optimizer. In various embodiments of the present invention, component 112, via optimizer component 148, may collect data from the execution of the query to identify errors in estimates of the query optimizer (i.e., optimizer component 148); and submitting the query feedback and the runtime feedback to machine learning engine 144 to update the set of potentially useful models.

In step 318, component 112 trains the generated model. In various embodiments of the present invention, component 112, via machine learning engine 144, may train one or more generated models. In various embodiments of the present invention, component 112, via machine learning engine 144 may initiate a full initial training of a new model, initiate a retraining of an existing model, or performs an incremental update of the model dependent on the evaluation performed in the evaluate step in FIG. 2.

In step 320, component 112 outputs a new, updated, or re-trained model. In various embodiments of the present invention, component 112, via machine learning engine 144, may output one or more new, updated, or re-trained models based on the collected data from the execution of the query to identify errors in estimates of the query optimizer, the submitted query feedback and the runtime feedback, and/or the one or more trained generated models.

Figure 4:
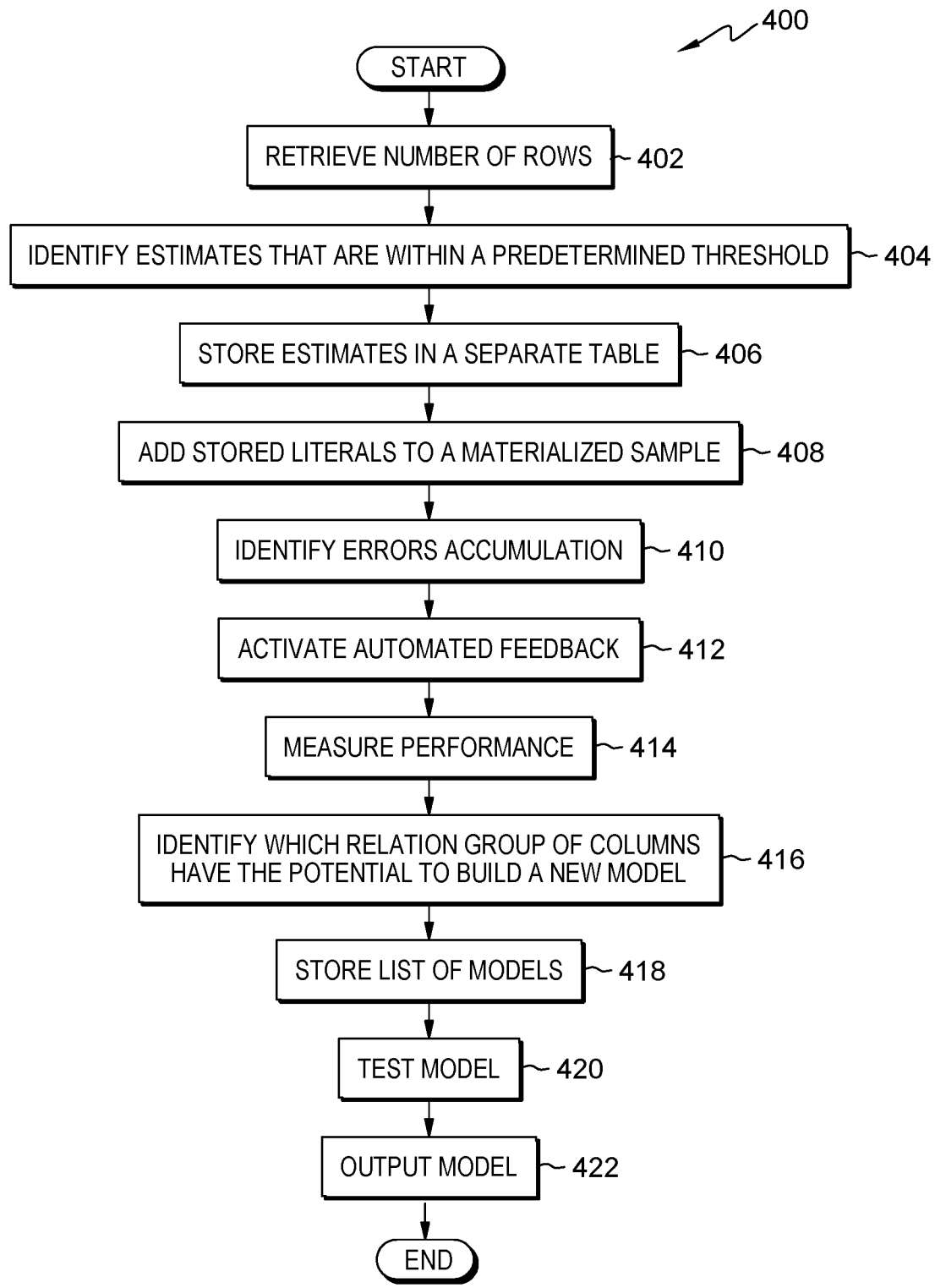
FIG. 4 illustrates operational steps of the automated feedback and continuous learning component, on a computing device within the distributed data processing environment of FIG. 1, for automated feedback and continuous learning for query optimization, in accordance with an embodiment of the present invention.

FIG. 4 illustrates operational steps of component 112, generally designated 400, in communication with computing device 110, within distributed data processing environment 100 of FIG. 1, for automated feedback and continuous learning for query optimization, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 402, component 112 retrieves the number of actual rows for each relation in the query or operator in an execution plan. In various embodiments of the present invention, component 112 may retrieve the number of rows for one or more relations in the query and/or operator in an execution plan, wherein the number of actual rows may be predetermined for the one or more relations in the query and/or operator in the execution plan.

In step 404, component 112 identifies cardinality estimates that are within a predetermined threshold. In various embodiments of the present invention, component 112 may determine and identify if cardinality estimates are within a predetermined threshold by comparing the number of retrieved rows against the predicated cardinality.

In step 406, component 112 stores cardinality estimates in a separate table. In the depicted embodiment, component 112 may store the cardinality estimates that are above or below a certain threshold (e.g., within a certain predetermine threshold) in a separate compressed structure in memory. In various embodiments of the present invention, component 112 may only keep the predicate literals and predicate information.

In step 408, component 112 add stored predicate literals to a materialized sample. In various embodiments of the present invention, component 112 may add one or more kept literals to a materialized sample or to a new sample collected randomly from the original relationship.

In step 410, component 112 identifies error accumulation. In various embodiments of the present invention, component 112 may identify when a model's predictions begin to accumulate errors. In various embodiments of the present invention, depending on the actual implementation of the proposed model, collected points that are miss-predicted may also be used to adjust the model parameters instead of fully retraining the model again. In various embodiments of the present invention, component 112 may collect column and multi-column statistics in an automated or manual mode to be more robust to the data changes by accounting for statistical correlation between multiple values. In various embodiments of the present invention, a proposed CFF model may be fully retrained when larger data changes occur, and the model's predictions start accumulating larger errors.

In step 412, component 112 activates automated feedback. In various embodiments of the present invention, component 112 may activate automated feedback to trigger the models retraining actions.

In step 414, component 112 measures performance of the model. In various embodiments of the present invention, component 112 may measure the performance of one or more models against the actual cardinalities collected from one or more individual components of an executed access plan.

In step 416, component 112 identifies which relation group of columns have the potential to build a new model. In various embodiments of the present invention, component 112 may utilize the observed feedback to determine and identify which relation or group of columns have the potential to build a new model once the optimizer realizes no model is pre-built on the relations or group of columns.

In step 418, component 112 stores a list of models on a database. In various embodiments of the present invention, component 112 may store one or more lists of models and the list of columns used to build the model in a database table on local storage 104 and/or shared storage 124

In step 420, component 112 tests a model. In various embodiments of the present invention, component 112 may test one or more new or re-trained models and/or fall back to a previous model after re-training, possibly avoiding a database service call to the database vendor. Additionally, in various embodiments, the model version and training timestamp is maintained to revert to the previous model version automatically or as directed by the database vendor if there is a possible problem.

In step 422, component 112 outputs a model. In various embodiments of the present invention, component 112 may output and execute one or more models based on the stored list of models and the tested models and/or output and execute the previously executed model (i.e., fall back to the previous model).

Figure 5:
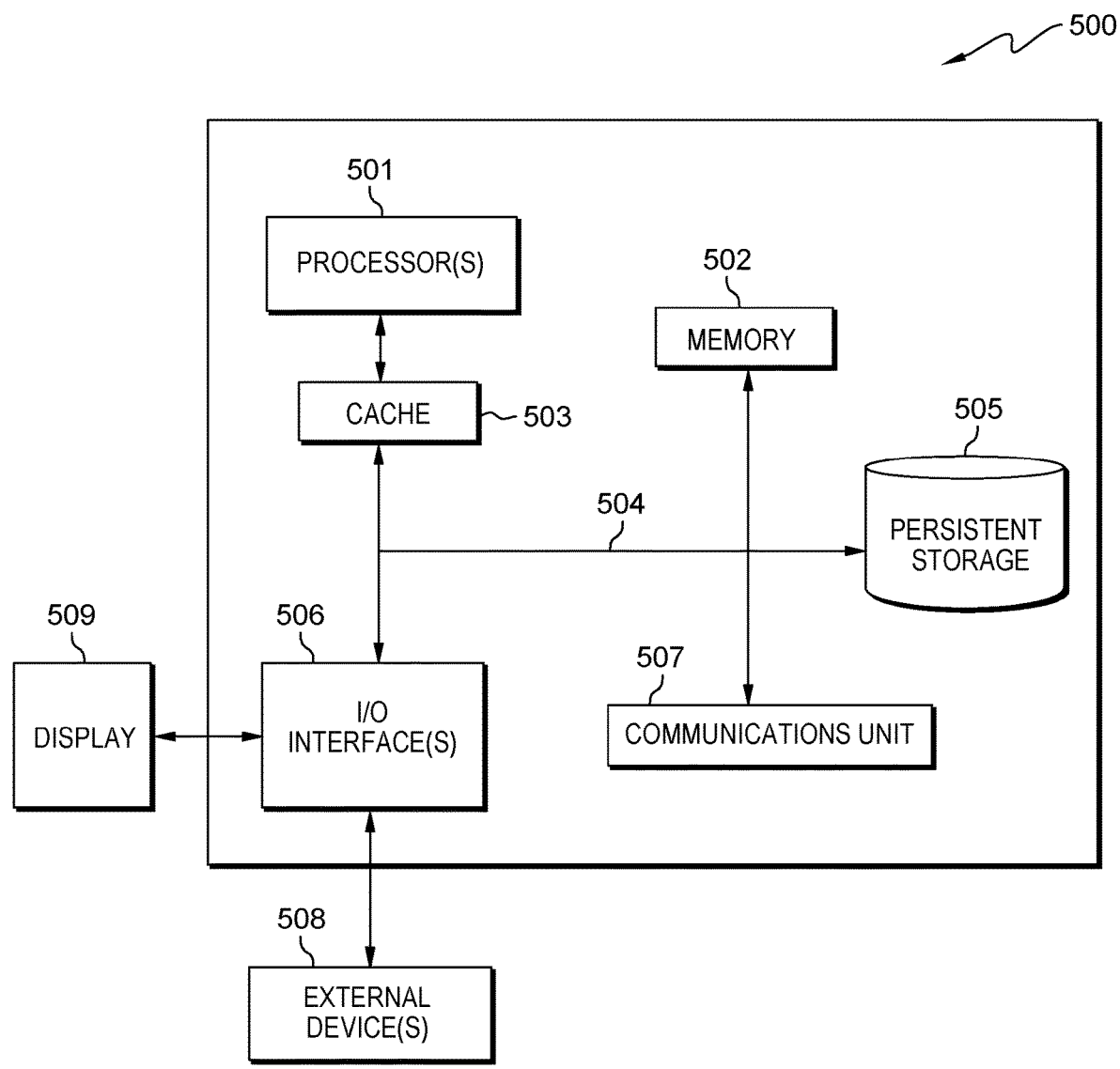
FIG. 5 depicts a block diagram of components of the server computer executing the automated feedback and continuous learning component within the distributed data processing environment of FIG. 1, in accordance with an embodiment of the present invention.

FIG. 5 depicts a block diagram of components of server computer 120 within distributed data processing environment 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 depicts computer system 500, where server computing 120 represents an example of computer system 500 that includes component 112. The computer system includes processors 501, cache 503, memory 502, persistent storage 505, communications unit 507, input/output (I/O) interface (s) 506, display 509, external device(s) 508 and communications fabric 504. Communications fabric 504 provides communications between cache 503, memory 502, persistent storage 505, communications unit 507, and input/output (I/O) interface(s) 506. Communications fabric 504 may be implemented with any architecture designed for passing data and/or control information between processors (such as microprocessors, communications, and network processors, etc.), system memory, peripheral devices, and any other hardware components within a system. For example, communications fabric 504 may be implemented with one or more buses or a crossbar switch.

Memory 502 and persistent storage 505 are computer readable storage media. In this embodiment, memory 502 includes random access memory (RAM). In general, memory 502 may include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 enables for input and output of data with other devices that may be connected to each computer system. For example, I/O interface 506 may provide a connection to external devices 508 such as a keyboard, keypad, a touch screen, and/or some other suitable input device. External devices 508 may also include portable computer readable storage media such as, for example, thumb drives, portable optical or magnetic disks, and memory cards. Software and data used to practice embodiments of the present invention may be stored on such portable computer readable storage media and may be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIG.s illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the FIG.s. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for query optimization, the computer-implemented method comprising:
   identifying one or more opportunities for improvement in a cardinality estimate using a workload feedback process comprising a query feedback performed during a query compilation;
   identifying a correlation and a relationship based on a structure of the query feedback;
   submitting the query feedback to a machine learning engine to update a set of models;
   updating the set of models based on the query feedback;
   outputting a new, updated, or re-trained model based on the collected data from the execution of the query to identify the errors in the estimates of a query optimizer, the query feedback, or a trained generated model; and
   falling back to a previous model after re-training, wherein a model version and training timestamp are maintained to revert to a previous version of a current model.

2. The computer-implemented method of claim 1 further comprising:
   generating the set of models using the set of column relationships or correlations of interest identified using the predetermined first criteria;
   performing data discovery on received data and meta-data using predetermined second criteria, wherein the data discovery comprises performing an analysis of the data and meta-data to identify relationships and correlations between columns in tables; and
   identifying a set of columns with relationships or correlations of interest within and across a plurality of tables in a database.

3. The computer-implemented method of claim 1 further comprising:
   executing the runtime feedback, wherein the runtime engine collects data from the execution of the query to identify errors in the query optimizer's estimates and miss-predicted points are used to adjust one or more model parameters instead of retraining an entire model; and
   executing query feedback during the query compilation.

4. The computer-implemented method of claim 1 further comprising:
   training the set of models, wherein the machine learning engine can initiate a full initial training of a new model, initiate a re-training of an existing model, or perform an incremental update of a model dependent on an evaluation.

5. The computer-implemented method of claim 1 further comprising:
   determining that an existing model is augmented with additional predetermined columns that will take more time to retrain; and
   splitting the existing model into two or more models to reduce training time or model size.

6. The computer-implemented method of claim 1, wherein training comprises:
   identifying candidate columns without executing queries against an entire set of predetermined data through a predetermined database interface.

7. A computer-implemented method for query optimization, the method comprising:
   identifying one or more cardinality estimates that are within a predetermined threshold by comparing one or more retrieved number of rows against one or more rows based on predicted cardinalities;
   adding one or more kept literals to a materialized sample or to a new sample collected randomly;
   identifying when predictions of a model begin to accumulate errors, wherein one or more collected points that are miss-predicted are used to adjust one or more parameters of the model instead of fully retraining the model;
   collecting column and multi-column statistics in an automated mode or a manual mode to be more robust to data changes by accounting for a statistical correlation between multiple values;
   activating an automated feedback to trigger a retraining action in the model;
   measuring performance of an estimated cardinality of the model against one or more actual cardinalities collected from one or more individual components of an executed access plan;
   identifying one or more relations or one or more groups of columns that have potential to build a new model based on a observed feedback from the measured performance, wherein the observed feedback is utilized to identify which of the one or more relations or the one or more groups of columns have the potential to build the new model once an optimizer identifies no model is pre-built on the one or more relations or the one or more groups of columns;
   testing the new model or a re-trained model; and
   executing the model based on a stored list of models and the tested model.

8. The computer-implemented method of claim 7 further comprising:
   retrieving number of rows for one or more relations in a query or an operator in an execution plan; and
   wherein identifying the one or more cardinality estimates that are within the predetermined threshold comprises:
   comparing the retrieved rows against the one or more predicted cardinalities.

9. The computer-implemented method of claim 7 further comprising:
   storing the one or more cardinality estimates that are above or below a certain threshold in a separate compressed structure in memory; and
   outputting the one or more models based on the stored list of models and the tested model.

10. The computer-implemented method of claim 7 further comprising:

falling back to a previous model after a re-training of the model, wherein a model version and training timestamp are maintained to revert to a previous version of a current model.

11. The computer-implemented method of claim 7 further comprising:
  determining that an existing model is augmented with additional predetermined columns that will take more time to retrain; and
  splitting the existing model into two or more models to reduce training time or model size.

12. A computer program product for query optimization, the computer program product comprising:
  one or more computer readable storage devices and program instructions stored on the one or more computer readable storage devices, the stored program instructions comprising:
    program instruction to identify one or more opportunities for improvement in a cardinality estimate using a workload feedback process comprising a query feedback performed during a query compilation;
    program instruction to identify a correlation and a relationship based on a structure of the query feedback;
    program instruction to submit the query feedback to a machine learning engine to update a set of models;
    program instruction to update the set of models based on the query feedback;
  program instruction to output a new, updated, or re-trained model based on the collected data from the execution of the query to identify the errors in the estimates of a query optimizer, the query feedback, or a trained generated model; and
    program instruction to fall back to a previous model after re-training, wherein a model version and training timestamp are maintained to revert to a previous version of a current model.

13. The computer program product of claim 12 further comprising:
  program instructions to execute the runtime feedback, wherein the runtime engine collects data from the execution of the query to identify errors in the query optimizer's estimates and miss-predicted points are used to adjust one or more model parameters instead of retraining an entire model; and
  program instructions to execute query feedback during the query compilation.

14. The computer program product of claim 12 further comprising:
  program instructions to determining that an existing model is augmented with additional predetermined columns that will take more time to retrain; and
  program instructions to split the existing model into two or more models to reduce training time or model size.

15. The computer program product of claim 13, further comprising:
  program instruction to collect data from an execution of a query to identify errors in estimates of a query optimizer.

16. A computer system for query optimization, the computer system comprising:
  one or more computer processors;
  one or more computer readable storage devices;
  program instructions stored on the one or more computer readable storage devices for execution by at least one of the one or more computer processors, the stored program instructions comprising:
    program instruction to identify one or more opportunities for improvement in a cardinality estimate using a workload feedback process comprising a query feedback performed during a query compilation;
    program instruction to identify a correlation and a relationship based on a structure of the query feedback;
    program instruction to submit the query feedback to a machine learning engine to update a set of models;
    program instruction to update the set of models based on the query feedback;
    program instruction to output a new, updated, or re-trained model based on the collected data from the execution of the query to identify the errors in the estimates of a query optimizer, the query feedback, or a trained generated model; and
    program instruction to fall back to a previous model after re-training, wherein a model version and training timestamp are maintained to revert to a previous version of a current model.

17. The computer system of claim 16 further comprising:
  program instructions to generate-the set of models using the set of relationships or correlations of interest identified using a predetermined first criteria;
  program instructions to perform data discovery on received data and meta-data using predetermined second criteria, wherein the data discovery comprises performing an analysis of the data and meta-data to identify relationships and correlations between tables; and
  program instructions to identify a set of relationships or correlations of interest within and across a plurality of tables in a database.

18. The computer system of claim 16 further comprising:
  program instructions to execute the runtime feedback, wherein the runtime engine collects data from the execution of the query to identify errors in the query optimizer's estimates and miss-predicted points are used to adjust one or more model parameters instead of retraining an entire model; and
  program instructions to execute query feedback during the query compilation.

19. The computer system of claim 16 further comprising:
  program instructions to determine that an existing model is augmented with additional predetermined columns that will take more time to retrain; and
  program instructions to split the existing model into two or more models to reduce training time or model size.

20. The computer system of claim 16 further comprising:
  program instruction to collect data from an execution of a query to identify errors in estimates of a query optimizer.

21. A computer system for query optimization, the computer system comprising:
  one or more computer processors;
  one or more computer readable storage devices;
  program instructions stored on the one or more computer readable storage devices for execution by at least one of the one or more computer processors, the stored program instructions comprising:
    program instruction to identify one or more cardinality estimates that are within a predetermined threshold by comparing one or more retrieved number of rows against one or more rows based on one or more predicted cardinalities;

program instruction to add one or more kept literals to a materialized sample or to a new sample collected randomly;

program instruction to identify when predictions of a model begin to accumulate errors, wherein one or more collected points that are miss-predicted are used to adjust one or more parameters of the model instead of fully retraining the model;

program instruction to collect column and multi-column statistics in an automated mode or a manual mode to be more robust to data changes by accounting for a statistical correlation between multiple values;

program instruction to activate an automated feedback to trigger a retraining action in the model;

program instruction to measure performance of an estimated cardinality of the model against one or more actual cardinalities collected from one or more individual components of an executed access plan;

program instructions to identify one or more relations or one or more groups of columns that have potential to build a new model based on a observed feedback from the measured performance, wherein the observed feedback is utilized to identify which of the one or more relations or the one or more groups of columns have the potential to build the new model once an optimizer identifies no model is pre-built on the one or more relations or the one or more groups of columns;

program instruction to test the new model or a re-trained model; and program instruction to execute the model based on a stored list of models and the tested model.

22. The computer system of claim of claim 21 further comprising:

program instructions to retrieve a number of rows for one or more relations in a query or an operator in an execution plan;

wherein identifying the one or more cardinality estimates that are within the predetermined threshold comprises:
program instructions to compare the one or more retrieved number of rows against a predicted cardinality;

program instructions to store the cardinality estimates that are above or below a certain threshold in a separate compressed structure in memory; and program instructions to output the one or more models based on the stored list of models and the tested model.

23. The computer system of claim of claim 21 further comprising:

program instructions to fall back to a previous model after the re-training of the model, wherein a model version and training timestamp are maintained to revert to a previous version of a current model.

24. The computer system of claim of claim 21 further comprising:

program instructions to determine that an existing model is augmented with additional predetermined columns that will take more time to retrain; and program instructions to split the existing model into two or more models to reduce training time or model size.

25. The computer-implemented method of claim 1, further comprising:

collecting data from an execution of a query to identify errors in estimates of a query optimizer.

* * * * *